United States Patent [19]
Iwamoto

[11] Patent Number: 5,966,494
[45] Date of Patent: Oct. 12, 1999

[54] APPARATUS AND METHOD FOR RECORDING AND REPRODUCING A VIDEO SIGNAL TO AND FROM A RECORD MEDIUM

[75] Inventor: Tetsuya Iwamoto, Kanagawa, Japan

[73] Assignee: Sony Corporation, Tokyo, Japan

[21] Appl. No.: 08/811,262

[22] Filed: Mar. 4, 1997

[30] Foreign Application Priority Data

Mar. 7, 1996 [JP] Japan .................................. 8-050305

[51] Int. Cl.$^6$ .............................. H04N 5/92; H04N 5/76
[52] U.S. Cl. ................................ 386/4; 386/33; 386/95; 386/111
[58] Field of Search .............................. 386/1, 4, 33, 95, 386/111, 112, 52, 53–55, 64; 348/423; 360/13; H04N 5/76, 5/92, 9/79, 11/02, 11/04, 7/12

[56] References Cited

U.S. PATENT DOCUMENTS

| 5,642,174 | 6/1997 | Kazui et al. | .................................. 386/4 |
| 5,822,024 | 10/1998 | Setogawa et al. | .......................... 386/4 |
| 5,841,935 | 11/1998 | Asai et al. | .................................. 386/33 |

*Primary Examiner*—Thai Tran
*Attorney, Agent, or Firm*—Frommer Lawrence & Haug, LLP.; William S. Frommer

[57] ABSTRACT

Digital video tape recorder which includes a color framing sequence as part of a recorded control signal during standard recording, and which maintains synchronous color framing and/or continuous groups of pictures in two different editing modes in which a newly-suppled video signal is recorded on a magnetic tape already having stored thereon a previously recorded video signal. In a normal recording mode, a color framing signal indicating the occurrence of a newly supplied picture is detected in a supplied video signal. A video control signal that includes the detected color framing signal is generated and is recorded in a control track of the magnetic tape and the video signal is recorded in synchronization with the detected color framing signal in successive oblique tracks on the magnetic tape. In the first one of the editing modes, the traveling speed of the record medium is established so that the phase of the detected color framing signal and the phase of the generated reproduced color framing signal coincide thus maintaining synchronous color framing between the previously recorded and newly recorded video signals. In a second one of the editing modes, the group of pictures signal is inverted when the detected color framing signal and the reproduced color framing signal are out of phase by a pre-set amount this maintaining continuous groups of pictures between the previously recorded and newly recorded video signals.

24 Claims, 5 Drawing Sheets

APPARATUS AND METHOD FOR RECORDING AND REPRODUCING A VIDEO SIGNAL TO AND FROM A RECORD MEDIUM

BACKGROUND OF THE INVENTION

The present invention relates to a video tape recorder and, more particularly, to apparatus and method for recording and reproducing a video signal to and from a record medium having means for maintaining synchronous color framing and/or synchronous groups of pictures during an editing operation.

As is known, a composite video signal (e.g., an NTSC signal or a PAL signal) in MPEG-based decoding systems is digitized to produce a digital video signal and the digital video signal is compressed to form groups of pictures (GOP) comprised of both intraframe and interframe video signals. The compressed video signal then is recorded on helical tracks on a magnetic tape and a control (CTL) signal, which is provided to control the tape traveling speed during a playback operation, is recorded on a control track of the magnetic tape.

During a playback operation, the compressed video signal is reproduced from the magnetic tape, the reproduced data (i.e., signal) is expanded to produce non-compressed digital video data, the non-compressed data is converted to an analog composite video signal, and the composite video signal is supplied to a video monitor which displays the video picture. Unfortunately, the quality of the reproduced and subsequently decoded video signal is deteriorated as compared to the originally supplied signal that was digitized, encoded and recorded on the magnetic tape. One cause for such deterioration is the product of Y/C separation wherein a portion of the chroma (C) signal remains as part of the luminance (Y) signal after separation. Color framing (CF) sequence information, which is part of the chrominance portion of the video signal, remains in the luminance signal after Y/C separation and, thus, the original composite video signal cannot be properly reconstructed from the recorded digital data. Hence, there is frequency deterioration as well as other types of deterioration in the reproduced composite video signal.

Furthermore, when recorded digital data is edited, it is necessary to perform a so-called "disconnecting" and "reconnecting" of each GOP in order to properly edit the recorded digital data. The continuity (to be discussed) of the color framing (CF) sequence of the recorded as well as the newly-recorded (i.e., edited) signals should be maintained in order to provide a properly edited signal.

Still further, another problem encountered with prior art devices, such as discussed above, is their general inability to generate and provide a correct CF signal to externally coupled video processing devices. Such devices generally require that compressed video data be supplied thereto in synchronization with the CF signal, and since it is difficult to generate a correct CF signal from the reproduced video data, such synchronization is not easily carried out.

OBJECTS OF THE INVENTION

Therefore, it is an object of the present invention to provide apparatus and method for recording and reproducing a video signal to and from a record medium which overcome the shortcomings of the above-described devices.

Another object of the present invention is to provide apparatus and method for recording and reproducing a video signal in which the continuity of the CF signal of the reproduced video data during a reproduction operation is maintained.

A further object of the present invention is to provide apparatus and method which maintains the continuity of the CF sequence during an editing operation.

An additional object of the present invention is to provide apparatus and method which maintains the continuity of the groups of pictures during an editing operation.

Still another object of the invention is to provide a technique for providing a reproduced compressed video signal in synchronization with a CF signal to, for example, an externally coupled video processing device.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for receiving a video signal, detecting a color framing signal that indicates an occurrence of each new picture in the received video signal, compressing the received video signal, moving and synchronizing the travelling speed of the record medium with the detected color framing signal, generating a video control signal that includes the detected color framing signal, recording the generated control signal in a control track on the record medium, and recording in synchronization with the detected color framing signal the compressed video signal in successive oblique tracks on the record medium.

As one aspect of the present invention, a duty ratio of the control signal is changed to represent the detected color framing signal.

As another aspect of the present invention, the compressed video signal is reproduced from the record medium, and then expanded and converted in synchronization with the detected color framing signal to produce a composite video signal.

In accordance with another embodiment of the present invention, apparatus and method are provided for receiving a video signal to be recorded on a record medium that has compressed video signals and a control signal previously recorded thereon, detecting a color framing signal in the received video signal, reproducing the previously recorded control signal from the record medium, generating from the reproduced control signal a reproduced color framing signal that represents a color framing of the previously recorded video signals, moving the record medium at a particular speed so as to synchronize a phase of the detected color framing signal and a phase of the generated reproduced color framing signal, generating a group of pictures signal from the detected color framing signal, compressing in synchronization with the generated group of pictures signal the received video signal, and recording in synchronization with the group of pictures signal the compressed video signal on the record medium.

As one aspect of this embodiment, compression and recording occur in synchronization with the group of pictures signal such that the compressed video signal is recorded on the record medium at a position immediately following a group of pictures of the previously recorded compressed video signals.

In accordance with a further embodiment of the present invention, apparatus and method are provided for receiving a video signal to be recorded on a record medium having compressed video signals and a control signal previously recorded thereon, detecting a color framing signal in the received video signal, reproducing the previously recorded control signal from the record medium, generating from the reproduced control signal a reproduced color framing signal, generating a group of pictures signal from the detected color framing signal, inverting the group of pictures signal when the detected color framing signal and the reproduced color framing signal are out of phase by a predetermined amount, compressing in synchronization with the group of pictures signal the received video signal, and recording in synchronization with the group of pictures signal the compressed video signal on the record medium.

As one aspect of this embodiment, a successive plurality of pictures of the received video signal are compressed, wherein a first of the plurality of pictures does not coincide with a first of the received pictures when the group of pictures signal is inverted.

BRIEF DESCRIPTION OF THE DRAWINGS

The following detailed description, given by way of example, and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
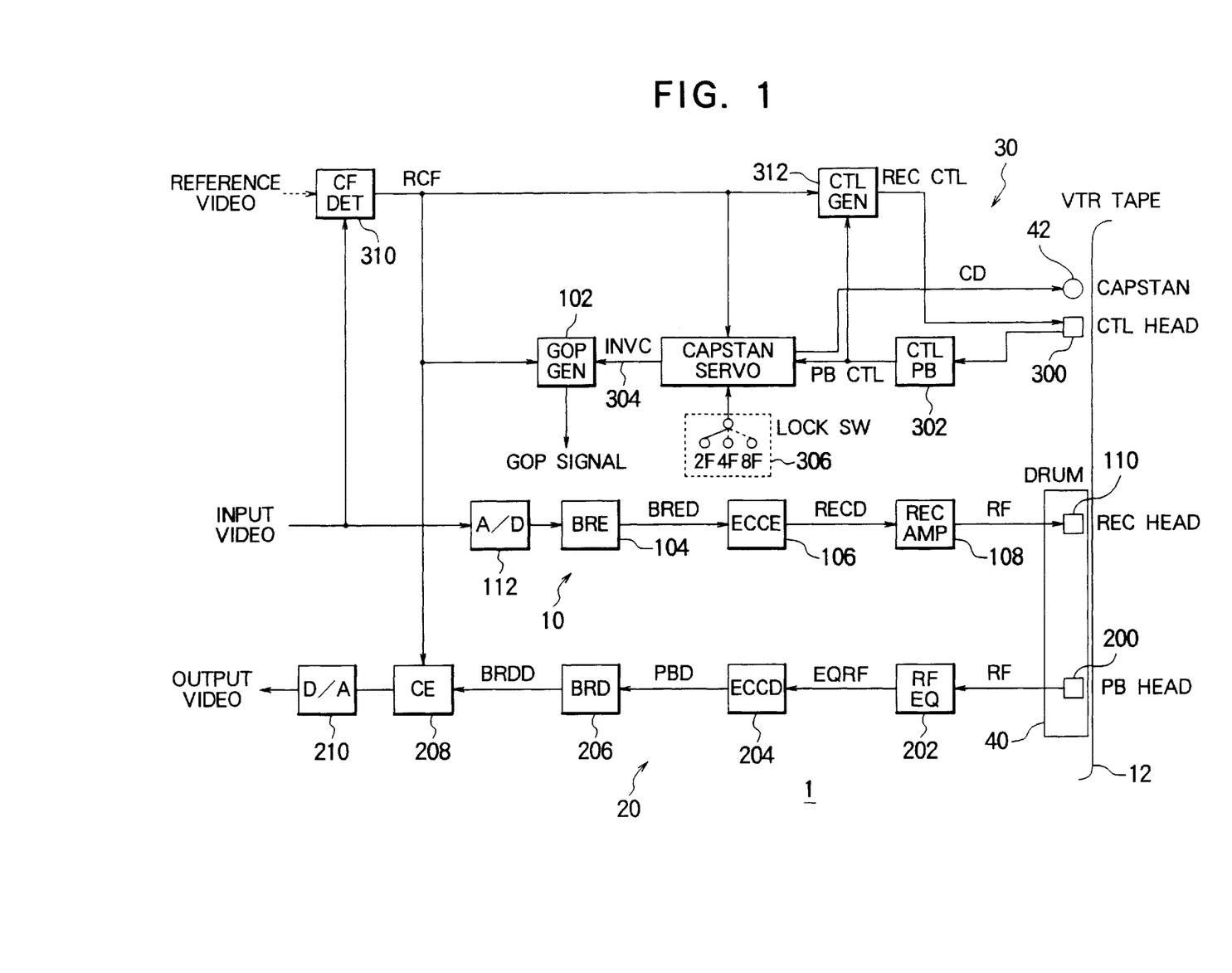
FIG. 1 is a block diagram of apparatus for recording and reproducing a video signal to and from a record medium in accordance with the present invention.

Referring now to the drawings, FIG. 1 is a block diagram of apparatus for recording and reproducing a video signal to and from a record medium (hereinafter, recording/reproducing apparatus 1) in accordance with the present invention. Recording/reproducing apparatus 1 is comprised of a recording section 10, a reproducing section 20, a control signal processing section 30, a drum 40 and a capstan 42. Recording section 10 is comprised of a GOP signal generating circuit 102, a bit-rate reduction encoder (BRE) 104, an error correction encoding circuit (ECCE) 106, a recording amplification circuit 108, a recording head 110 (included on drum 40) and an analog-to-digital (A/D) converter 112. Reproducing section 20 is comprised of a playback head 200 (included on drum 40), an RF equalization circuit 202, an error correction decoder (ECCD) 204, a bit-rate reduction decoder (BRD) 206, a composite encoder 208, and a digital-to-analog (D/A) converter 210. Control signal processing section 30 is comprised of a control (CTL) recording/playback head 300, a CTL playback control circuit 302, a capstan servo circuit 304, a framing sequence setting (LOCK SW) circuit 306, a color framing signal detector 310, and a CTL signal generator 312.

During a recording operation of recording/reproducing apparatus 1 of the present invention, an analog composite video signal supplied to an input video terminal of the apparatus is converted to a digital signal by A/D converter 112 which supplies the digital video signal to BRE circuit 104 (also referred to herein as compression/coding circuit 104). Compression/coding circuit 104 compresses and encodes the digital video signal to form compressed units of groups of pictures (GOPs) in response to a GOP signal supplied from GOP generating circuit 102 (to be discussed) and supplies the compressed/encoded digital signal (signal BRED) comprised of, for example, alternating I (intra-coded) and B (bi-directionally intra-encoded) frames, to error correction code encoder 106. As discussed further herein, the types of frames included in each GOP is identified as the frame sequence.

ECCE encoder (ECCE) 106 adds error correction code (ECC) to the supplied compressed digital video data and the resultant digital data (signal RECD) is supplied via recording amplifier 108 to recording head 110 which records the digital data in helical tracks on magnetic tape 12. As is well known, recording amplifier 108 modulates the digital signal and converts the modulated signal to a recording signal RF that is suitable for recording on the magnetic recording medium.

As will be discussed, GOP generating circuit 102 generates the GOP signal depending on the values of an inversion (INVC) signal and a reference color framing (RCF) signal supplied from capstan servo circuit 304 and color framing detecting circuit 310, respectively (to be discussed).

During a reproduction operation of recording/reproducing apparatus 1 of the present invention, playback head 200 reproduces the recorded data from the helical tracks on magnetic tape 12 and supplies the reproduced RF signal to RF equalization circuit 202 which performs various operations, including waveform equalization, on the supplied RF signal and supplies an equalized RF (EQRF) digital signal to ECC decoder (ECCD) 204. ECCD decoder 204 detects and corrects errors in the supplied digital data using the error correction code therein in a manner well known in the art and supplies the error corrected signal (signal PBD) to BRD circuit 206 (also referred to herein as expander/decoder 206).

Expander/decoder 206 expands and decodes the supplied digital data in synchronization with the generated GOP signal (to be discussed) in a manner inverse to that performed by compression/encoder 104 so as to produce an expanded (uncompressed) digital video signal (signal BRDD). The expanded digital video signal is converted in CE circuit 208 to a composite digital signal in synchronization with the detected reference color framing signal (signal RCF) (to be discussed) and supplies the composite digital video signal to D/A converter 210 which produces therefrom a composite analog video signal. The composite analog video signal is supplied as an output signal at an output video terminal.

During both the recording and reproducing operations of recording/reproducing apparatus 1 of the present invention, CF detector 310 of the control signal processing portion 30 detects the color framing signal included in a reference video signal of a composite video signal, or included in the input video signal, where it detects the composite analog black burst signal externally supplied and which is used to synchronize plural video processing devices, for example, in a broadcasting station. The detected color framing signal (or burst signal) is supplied as the reference color framing (RCF) signal to capstan servo circuit 304, CTL signal generating circuit 312, GOP signal generator 102 and CE circuit 208. CTL signal generating circuit 312 generates a recording control (REC CTL) signal which includes the color framing signal representing the color framing sequence of the video signal being recorded on the magnetic tape. The recording control signal is generated in accordance with the change of a duty ratio of a reproduced CTL signal utilizing the reference CF signal (to be further discussed) supplied from CF detector 310. The recording control signal is recorded on a control track on magnetic tape 12 by CTL recording/reproducing head 300.

During the previously discussed reproducing operation, CTL recording/reproducing head 300 reproduces the recorded CTL signal from the control track of magnetic tape 12 and supplies the reproduced CTL signal to CTL playback control circuit 302 which generates therefrom a playback CTL (PB CTL) signal in a digital format and which supplies the digital playback CTL signal to both CTL generating circuit 312 and capstan servo circuit 304.

Framing circuit 306 is manually set by a user to indicate the desired format of the video data played. For example, the color framing sequence of an NTSC composite video signal (525/60) is in units of four field (i.e. 4F), and the CF sequence of a PAL composite video signal (625/50) is in units of eight fields (i.e., 8F). The relative phase difference of the color framing of the reproduced video signal with respect to the reference video signal is controlled in accordance with the manually established value of framing sequence setting circuit 306. Framing sequence setting circuit 306 further may be manually set to "2F", wherein the phase of the reference CF signal and the phase of the reproduced video signal do not coincide for either NTSC or PAL signals during playback thereof (to be discussed). The manually set value of the CF sequence data is supplied to capstan servo circuit 304.

As will be understood with reference to FIGS. 2–5 of the drawings, capstan servo circuit 304 operably controls GOP generating circuit 102 to invert the logical value (i.e., phase) of the generated GOP signal by means of an inversion INVC signal. That is, signal INVC is established high (or suitably low) when the color framing of the reference CF signal and the color framing of the playback CTL signal do not coincide. When the color framings thereof do not coincide, GOP generator 102 is controlled to inverse its generated GOP signal. Capstan servo circuit 304 further generates a capstan drive signal (signal CD) which controls capstan 42 thus controlling the traveling speed of magnetic tape 12 so as to establish a phase difference between the color framing of the CTL signal and the color framing of the reference CF signal to correspond with the framing value set in framing sequence setting circuit 306.

The operation of recording/reproducing apparatus 1 in accordance with the present invention will now be discussed with reference to FIGS. 2–5 of the drawings. Referring first to FIGS. 2A to 2D, waveform diagrams of the color framing of the input video signal, the recording control signal of a 625/50 (PAL) signal, a recording control signal of a 525/60 (NTSC) signal, and a generated GOP signal during a recording operation are shown. A PAL or NTSC video signal supplied to the input video terminal is converted to a digital signal in A/D converter 112 and compressed/encoded in BRE circuit 104, as previously discussed. The compressed/ encoded video signal (signal BRED) is comprised of successive GOPs, each of which includes (for purposes of the description herein) an I frame followed by a B frame.

Figures 2A, 2B:
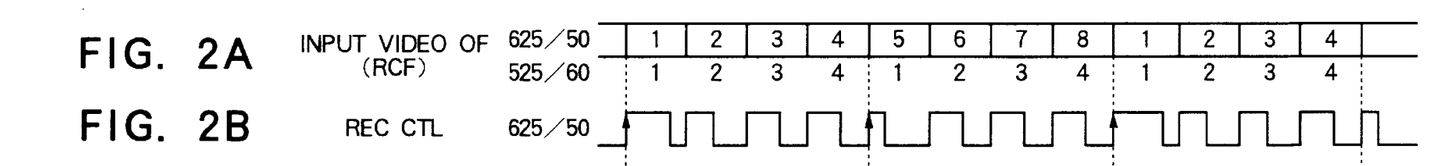
FIGS. 2A–2D are waveform diagrams of a reference color framing signal, two different recording control signals, and a GOP signal during a recording operation of the present invention.
Figure 2C:
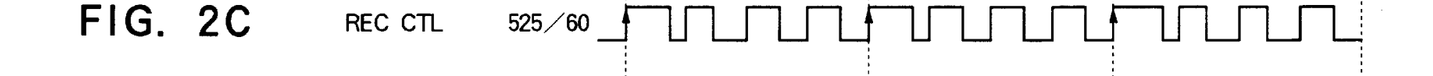
Figure 2D:
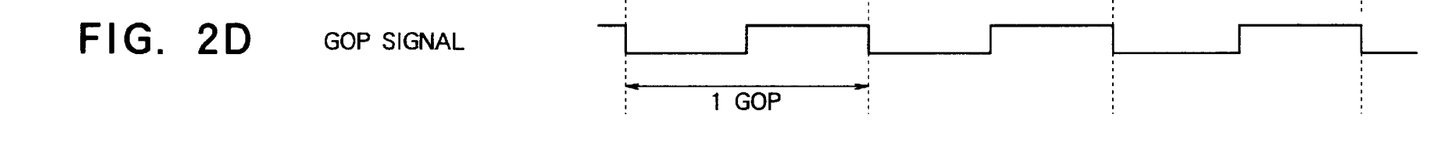

In accordance with the present invention, color framing detector 310 detects the color framing (CF) signal either from a reference video signal externally supplied or from the video signal supplied to the input video terminal, and generates a reference color framing (RCF) signal, schematically illustrated in FIG. 2A. As previously mentioned, CTL signal generator 312 converts the RCF signal to the duty ratio of the CTL signal, wherein FIG. 2B is a waveform of the generated CTL signal of a PAL (625/50) video signal, and FIG. 2C is a waveform of a generated CTL signal of an NTSC (525/60) video signal. As shown, the duty ratio of the "PAL" CTL signal (FIG. 2B) is modified differently in the first and fifth fields of every eight fields, and the duty cycle of the "NTSC" CTL signal (FIG. 2C) is modified in the first of every four fields. The generated CTL signal then is recorded on the control track of magnetic tape 12, as previously discussed. FIG. 2D is a waveform of the GOP signal indicating that four fields of the video signal are included in each GOP.

Figure 3A:
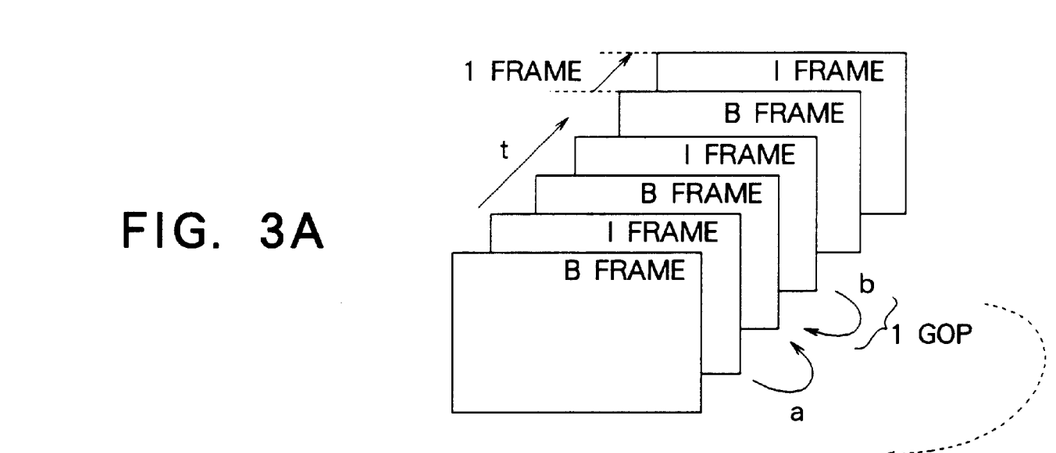
FIGS. 3A and 3B are schematic illustrations of a group of pictures and the group of pictures recorded in tracks on a magnetic tape, respectively.
Figure 3B:
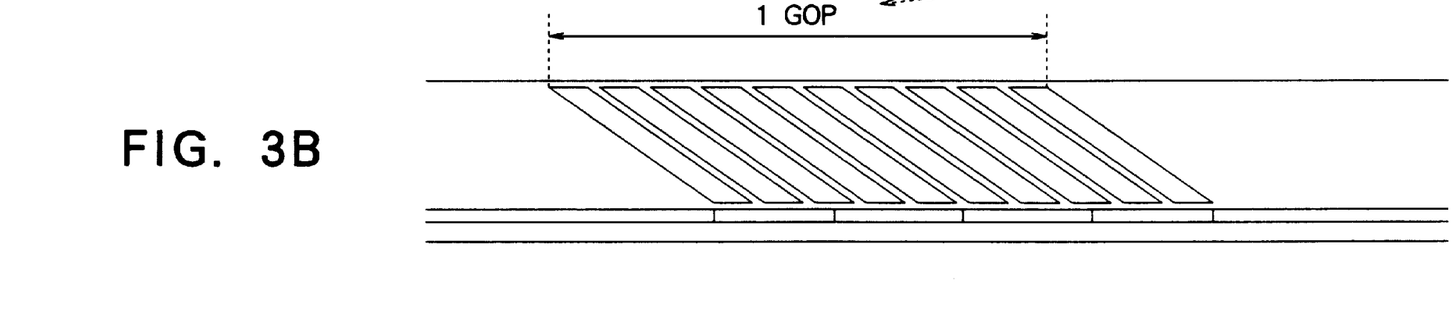

Referring next to FIGS. 3A and 3B, FIG. 3A schematically illustrates I-frames (intra-encoded frames) and B-frames (bi-directionally inter-encoded frames) included in successive GOPs, and FIG. 3B schematically illustrates helical tracks on the magnetic tape having the GOPs recorded therein. As previously mentioned, compression/ encoding circuit 104 operates in synchronization with the generated GOP signal (FIG. 2D) so as to compress and encode the original video data to produce one GOP (FIG. 3A) during each complete cycle of the GOP signal. Similarly, ECC encoder 106, recording amplifier 108 and recording head 110 operate in synchronization with the GOP signal so that each GOP has error correction data added thereto, amplified, and recorded in the tracks shown in FIG. 3B.

When recorded data is reproduced in a normal or standard reproducing mode of recording/reproducing apparatus 1 of the present invention, recording head 110 reproduces the recorded digital data and at the same time CTL head 300 reproduces the recorded CTL signal from the control track of magnetic tape 12, wherein the playback CTL signal is generated in CTL playback circuit 302 from the reproduced signal, as previously discussed. Capstan servo circuit 304 detects the change of the duty ratio of the playback CTL signal utilizing the set value of framing sequence setting circuit 306 so as to reproduce the CF signal of the reproduced data. Capstan servo circuit 304 then generates the capstan drive signal (signal CD) to control the phase of the reproduced CF signal relative to the phase of the RCF signal generated by color framing detecting circuit 310 so as to control the traveling speed of magnetic tape 12. Reproducing section 20 then reproduces, detects and corrects errors, and subsequently decodes the reproduced signal in the manner previously discussed. CE circuit 208 converts the error corrected/decoded reproduced signal to a composite video signal in synchronism with the RCF signal, and the converted signal is supplied to D/A converter 210 which generates an analog composite video signal that is supplied as an output signal at the output video terminal.

The operation of the first editing operation of recording/ reproducing apparatus 1 in accordance with the present invention will be described with reference to FIGS. 4A–4G of the drawings. As previously mentioned with respect to the shortcomings of existing devices, it is desirable, if not, necessary, to make the color framing sequence continuous (i.e., uninterrupted or unaffected) when newly-provided video signals are recorded over or after video signals previously recorded on the magnetic tape. During the editing operation (also called "insert recording" operation) of the present invention, the "boundaries" of previously and newly-recorded GOPs coincide so that the succession of, for example, I-frames and B-frames (such as shown in FIG. 3A) remain in tact. Also, the previously recorded CTL signal in the control track of magnetic tape 12 is not overwritten during the below-discussed editing operation (i.e., a new CTL signal is not recorded over the previously recorded CTL signal).

The first editing operation of the present invention edits and records a newly-supplied video signal onto magnetic tape 12 that already has previously-recorded video signals recorded thereon while the apparatus "imparts" priority to the CF signal which, as will be understood, indicates that the phase of the CF signal is maintained at the point of editing. Assuming the input video signal is a PAL (625/50) signal, the framing sequence setting circuit 306 is manually set to "8F" so that the phase of the CF signal is maintained.

Figures 4A, 4B, 4C:
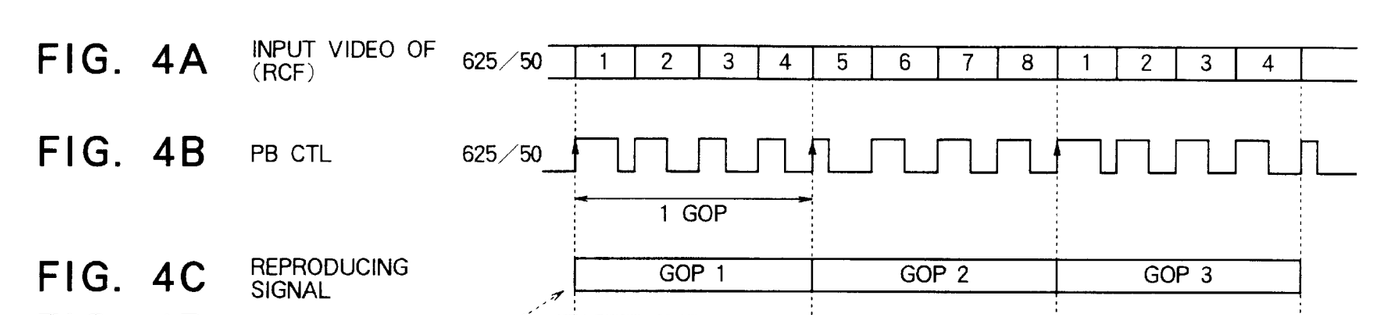
FIGS. 4A–4F are waveform diagrams of various signals during an editing operation of the present invention.
Figures 4D, 4E:
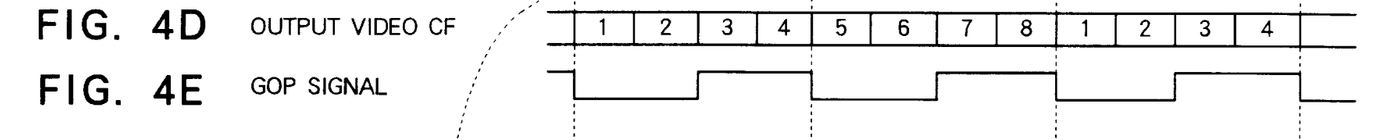
Figures 4F, 4G:
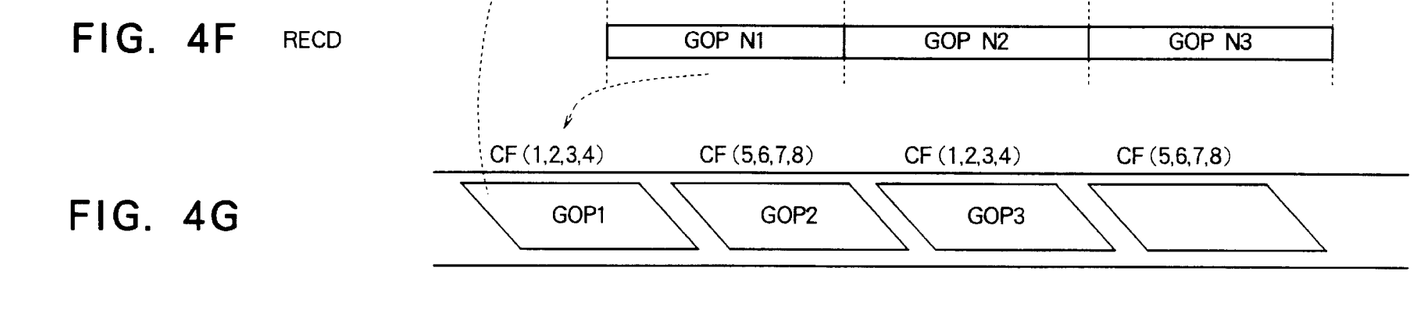
FIG. 4G is a schematic illustration of GOPs recorded on a magnetic tape in accordance with the present invention.

FIG. 4A is the color framing signal of the PAL signal supplied at the input video terminal and which is to be recorded (insert recorded) on magnetic tape 12. Prior to recording the newly-supplied signal, magnetic tape 12 is reproduced from a point previous to that at which the newly-supplied video signal is to be recorded thereon, wherein FIG. 4B is a waveform diagram of the playback CTL signal representing the CTL signal reproduced from magnetic tape 12. Referring to both FIGS. 4A and 4B, it is seen that the phase of the RCF signal and the phase of the playback CTL signal coincide and, thus, the color framing sequence contained in both GOPs (i.e., the reference signal and the reproduced signal) coincide. FIG. 4C represents each new GOP to be recorded on magnetic tape 12 and FIG. 4D represents the color framing of the reproduced video signal, as represented by the playback CTL signal shown in FIG. 4B. Since the phases of the color framing signals coincide, capstan servo circuit 304 provides a suitably low inversion (INVC) signal thus causing GOP signal generating circuit 102 to not invert the value (phase) of the GOPS, as represented by the GOP signal shown in FIG. 4E. Recording section 10 then encodes and records the supplied video signal on magnetic tape 12 such that the beginning of GOP "N1", shown in FIG. 4F coincides with the end of a previously recorded GOP on magnetic tape 12. As previously discussed, capstan servo circuit 304 controls capstan 42 in a manner such that the phase of the RCF signal and the phase of the reproduced CF signal coincide. FIG. 4G schematically illustrates the GOPs. of the newly-recorded signals on magnetic tape 12, as well as the corresponding CF signals.

The operation of the second editing operation of recording/reproducing apparatus 1 in accordance with the present invention will now be described with reference to FIGS. 5A to 5H of the drawings. The second editing operation involves recording compressed video data on magnetic tape 12 having video data already recorded thereon while the apparatus imparts priority to the absolute phase relationship of the video signal. That is, newly supplied video signals are recorded over previously-recorded video signals without regard to the continuity of the phases of the respective color framing signals. During this editing operation, the color framing sequences of the newly supplied video signal and the previously recorded video signal do not always coincide and, thus, a number of frame units which identify the insert recording position (to be discussed) is manually set to, for example, "2F" in framing sequence setting circuit 306.

Figure 5A:
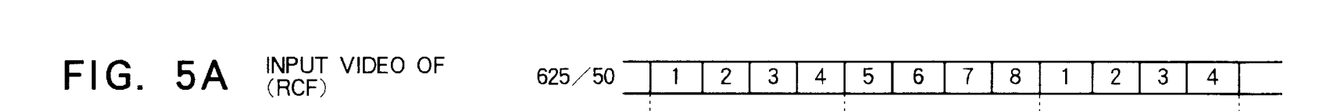
FIGS. 5A–5F are waveform diagrams of various signals during another editing operation of the present invention.
Figure 5B:
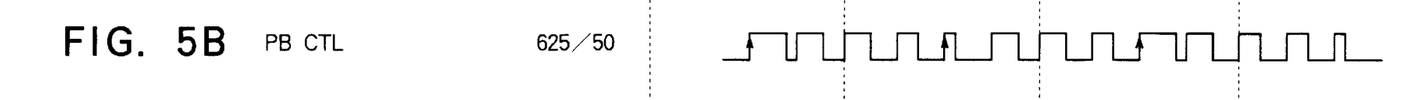
Figures 5C, 5D:
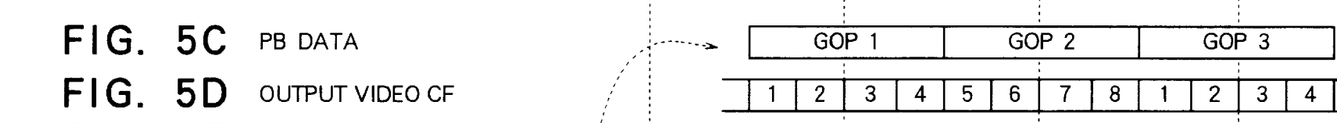

Assuming the CF sequence of a newly supplied video signal and the CF sequence of a previously recorded video signal are deviated from one another by a period of two fields (one frame), FIG. 5A schematically illustrates the color framing sequence of the input video signal (of a 625/50 format) to be recorded on magnetic tape 12, and FIG. 5B is a waveform of a playback CTL signal representing the color framing sequence of the previously recorded video signal. Referring to FIGS. 5A and 5B, it is seen that the phase of the playback CTL signal and the phase of the reference color framing signal represent an offset (i.e., deviation) of two fields. FIG. 5C schematically illustrates each reproduced GOP which, as shown, corresponds to the playback CTL signal of FIG. 5B. FIG. 5D further illustrates the color framing sequence of the reproduced video signal (i.e., the previously recorded video signal).

Figure 5E:
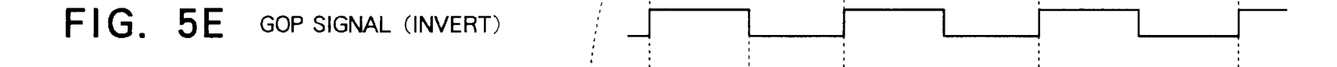
Figure 5F:
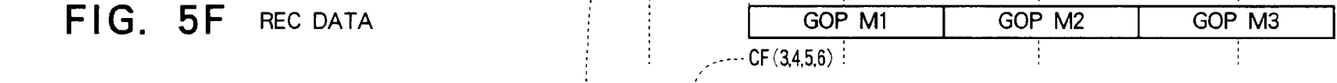
Figure 5G:
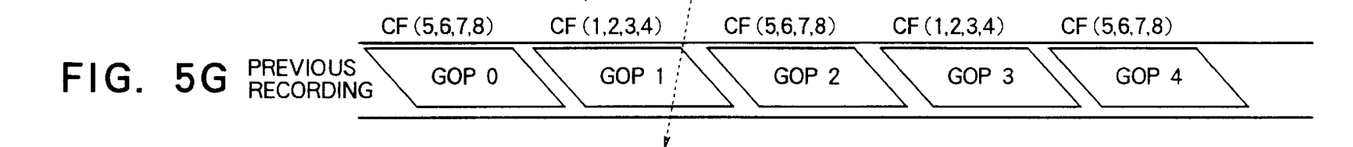
FIGS. 5G and 5H are schematic illustrations of previously recorded signals and newly recorded signals, respectively, in accordance with the present invention.
Figure 5H:
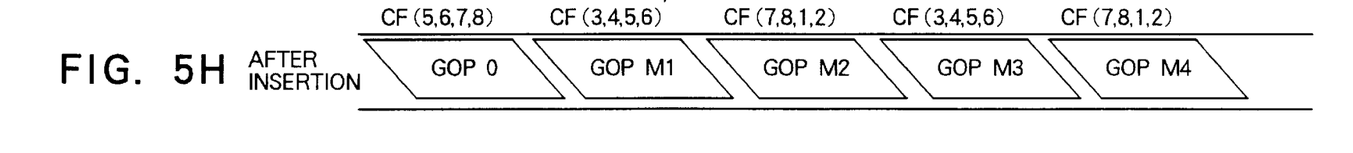

In accordance with the present invention, since the CF sequence of the output video signal (i.e., previously recorded signal) and the CF sequence of the input signal are offset by a period of two fields, capstan servo circuit 304 generates a suitably high inversion (INVC) signal which causes GOP generator 102 to generate the GOP signal shown in FIG. 5E. Comparing FIG. 5E to previously discussed FIG. 4E, it is seen that the newly supplied video signal will be recorded when the GOP signal goes low and, thus, in the second editing mode (or operation) of recording/reproducing apparatus 1 of the present invention, groups of pictures are formed by recording section 10 beginning at the point when the GOP signal goes low, such as schematically illustrated in FIG. 5F. That is, the first GOP (M1) to be recorded on magnetic tape 12 is formed of frames 3–6 and such GOP is recorded after the end of a previously recorded GOP (i.e., after a complete GOP is reproduced from magnetic tape 12). As shown in FIG. 5G, previously recorded GOPO is comprised of the CF sequence 5–8, GOP1 is comprised of CF sequence 1–4, etc., and FIG. 5H illustrates that new GOP M1 is recorded immediately after previously recorded GOPO and that GOP M1 includes the CF sequence 3–6, that the successive newly-recorded GOP M2 includes the CF sequence 7, 8, 1, 2, that the next successive newly-recorded GOP M3 includes the CF sequence 3–6, etc. Thus, while the CF sequences themselves are not continuous at the point of editing (i.e., overwriting), the GOP sequences are maintained.

Referring again to FIGS. 4E and 5E, the GOP signal is generated (in GOP generator 102) from the input (newly-supplied) signal, but when the newly-supplied signal (i.e., signal to be recorded) and the previously recorded signal are "out of phase" by a period of two fields, the GOP signal is inverted (FIG. 5E) in response to the inverted INVC signal and, thus, the new GOP (GOP M1) is formed of the third through sixth fields of the newly-supplied signal (i.e., the first two fields are ignored), such as shown in FIG. 5F.

If the GOP to be recorded was formed of the first four fields of the supplied signal, the new GOP would then be recorded half way over a previously recorded GOP, such result being unacceptable and causing substantial deterioration in the resultant displayed video signal.

Thus, and in accordance with the present invention, the reproduced CTL signal alone can be utilized to control the reproduction of a recorded compressed/encoded video signal without the need to predetermine or pre-extract the GOP signal from the compressed data. It is further seen that the GOP signal need not be reproduced and decoded prior to the decoding of an edited video signal whereat a newly-provided signal was recorded over (or after) a previously recorded video signal. Still further, the present invention provides for two different editing modes, wherein in the first mode, both the CF sequence and the GOP sequence of previously recorded and newly recorded signals are maintained, and in the second editing mode, the GOP sequence of newly-recorded and previously recorded signals are maintained while the offset period of the newly formed GOPs is selectively controlled by the user. Still further, since reproduction and/or recording is carried out in synchronization with a reference CF signal, the apparatus can be controlled to operate in synchronism with externally supplied reference signals.

While the present invention has been particularly shown and described in conjunction with preferred embodiments thereof, it will be readily appreciated by those of ordinary skill in the art that various changes may be made without departing from the spirit and scope of the invention. For example, although the present invention has been described as recording/reproducing GOPs including I-frames and B-frames, the present invention is not limited to this specific compression format and may be applied to other types of GOPs, including other types of intra and/or inter-frame encoded video signals.

As another example, although the present discussion is directed to NTSC and PAL signals, the present invention is not limited solely to these types of signals and may be widely applied to the recording and reproducing of various other video signals.

Still further, although the present invention has been described as including the circuits in FIG. 1, the present invention is not limited to this block structure and may be widely applied to other types of circuits.

Therefore, it is intended that the appended claims be interpreted as including the embodiments described herein, the alternatives mentioned above, and all equivalents thereto.

What is claimed is:

1. Apparatus for recording a video signal on a record medium, comprising:

means for receiving a video signal;

means for detecting in the received video signal a color framing signal indicating an occurrence of each new picture in the received video signal;

means for compressing the received video signal to produce a compressed video signal representing a compressed group of pictures of the received video signal;

means for moving the record medium at a travelling speed during recording of signals on the record medium;

means for synchronizing the travelling speed of the record medium with the detected color framing signal;

control signal generating means for generating a control signal of the compressed group of pictures, said control signal including the detected color framing signal;

control track recording means for recording the generated control signal in a control track on the record medium; and video signal recording means for recording in synchronization with the detected color framing signal the compressed video signal in successive oblique tracks on the record medium.

2. The apparatus of claim 1, wherein said control signal generating means is operable to generate said control signal having a change of a duty ratio thereof representing the detected color framing signal.

3. The apparatus of claim 1, further comprising:

means for reproducing the compressed video signal from the record medium;

means for expanding the reproduced compressed video signal to produce an expanded video signal; and means for converting in synchronization with the detected color framing signal the expanded video signal into a composite video signal.

4. Apparatus for recording a video signal on a record medium having video signals previously recorded thereon, comprising:

means for receiving a video signal to be recorded on said record medium, said record medium having compressed video signals previously recorded thereon in successive oblique tracks and having a control signal previously recorded thereon in a control track;

means for detecting in the received video signal a color framing signal indicating an occurrence of each new picture in the received video signal;

means for reproducing the previously recorded control signal from the control track of the record medium;

reproduced color framing signal generating means for generating from the reproduced control signal a reproduced color framing signal representing a color framing of said compressed video signals previously recorded on the record medium;

means for moving the record medium at an established travelling speed;

means for establishing the travelling speed of the record medium so as to synchronize a phase of the detected color framing signal and a phase of the generated reproduced color framing signal;

means for generating a group of pictures signal from the detected color framing signal;

compression means for compressing in synchronization with the generated group of pictures signal the received video signal to produce a compressed video signal, the compressed video signal representing a compressed group of pictures of the received video signal; and video signal recording means for recording in synchronization with the group of pictures signal the compressed video signal on the record medium.

5. The apparatus of claim 4, wherein said compression means and said video signal recording means are synchronized with the group of pictures signal such that the compressed video signal representing a compressed group of pictures of the received video signal is recorded on said record medium at a position immediately following a group of pictures of said previously recorded compressed video signals as indicated by the previously recorded control signal reproduced from the control track of the record medium.

6. The apparatus of claim 4, wherein said reproduced color framing signal generating means includes means for detecting a change of a duty ratio of the reproduced control signal; and means for generating said reproduced color framing signal from the detected changes of the duty ratio of the reproduced control signal.

7. The apparatus of claim 4, further comprising:

means for reproducing the compressed video signal from the record medium;

means for expanding the reproduced compressed video signal to produce an expanded video signal; and means for converting in synchronization with the detected color framing signal the expanded video signal into a composite video signal.

8. Apparatus for recording a video signal on a record medium having video signals previously recorded thereon, comprising:

means for receiving a video signal to be recorded on said record medium, said record medium having compressed video signals previously recorded thereon in successive oblique tracks and having a control signal previously recorded thereon in a control track;

means for detecting in the received video signal a color framing signal indicating an occurrence of each new picture in the received video signal;

means for reproducing the previously recorded control signal from the control track of the record medium;

reproduced color framing signal generating means for generating from the reproduced control signal a reproduced color framing signal representing a color framing of said compressed video signals previously recorded on the record medium;

means for generating a group of pictures signal from the detected color framing signal;

means for inverting said group of pictures signal when the detected color framing signal and the reproduced color framing signal are out of phase by a predetermined amount;

compression means for compressing in synchronization with the group of pictures signal the received video signal to produce a compressed video signal, the compressed video signal representing a compressed group of pictures of the received video signal; and video signal recording means for recording in synchronization with the group of pictures signal the compressed video signal on the record medium.

9. The apparatus of claim 8, wherein said compression means and said video signal recording means are synchronized with the group of pictures signal such that the compressed video signal representing a compressed group of pictures of the received video signal is recorded on said record medium at a position immediately following a group of pictures of said previously recorded compressed video signals as indicated by the previously recorded control signal reproduced from the control track of the record medium.

10. The apparatus of claim 8, wherein said compression means operates to compress a successive plurality of pictures of the received video signal, a first of said plurality of pictures not coinciding with a first of said received pictures when the group of pictures signal is inverted.

11. The apparatus of claim 8, wherein said reproduced color framing signal generating means includes means for detecting a change of a duty ratio of the reproduced control signal; and means for generating said reproduced color framing signal from the detected changes of the duty ratio of the reproduced control signal.

12. The apparatus of claim 8, further comprising:

means for reproducing the compressed video signal from the record medium;

means for expanding the reproduced compressed video signal to produce an expanded video signal; and means for converting in synchronization with the detected color framing signal the expanded video signal into a composite video signal.

13. Method of recording a video signal on a record medium, comprising the steps of:

receiving a video signal;

detecting in the received video signal a color framing signal indicating an occurrence of each new picture in the received video signal;

compressing the received video signal to produce a compressed video signal representing a compressed group of pictures of the received video signal;

moving the record medium at a travelling speed during recording of signals on the record medium;

synchronizing the travelling speed of the record medium with the detected color framing signal;

generating a control signal of the compressed group of pictures, the control signal including the detected color framing signal;

recording the generated control signal in a control track on the record medium; and recording in synchronization with the detected color framing signal the compressed video signal in successive oblique tracks on the record medium.

14. The method of claim 13, wherein the step of generating a control signal is carried out by changing a duty ratio of the control signal to represent the detected color framing signal.

15. The method of claim 13, further comprising the steps of:

reproducing the compressed video signal from the record medium;

expanding the reproduced compressed video signal to produce an expanded video signal; and converting in synchronization with the detected color framing signal the expanded video signal into a composite video signal.

16. Method of recording a video signal on a record medium having video signals previously recorded thereon, comprising the steps of:

receiving a video signal to be recorded on the record medium, the record medium having compressed video signals previously recorded thereon in successive oblique tracks and having a control signal previously recorded thereon in a control track;

detecting in the received video signal a color framing signal indicating an occurrence of each new picture in the received video signal;

reproducing the previously recorded control signal from the control track of the record medium;

generating from the reproduced control signal a reproduced color framing signal representing a color framing of the compressed video signals previously recorded on the record medium;

moving the record medium at an established travelling speed;

establishing the travelling speed of the record medium so as to synchronize a phase of the detected color framing signal and a phase of the generated reproduced color framing signal;

generating a group of pictures signal from the detected color framing signal;

compressing in synchronization with the generated group of pictures signal the received video signal to produce a compressed video signal, the compressed video signal representing a compressed group of pictures of the received video signal; and recording in synchronization with the group of pictures signal the compressed video signal on the record medium.

17. The method of claim 16, wherein the compressing and recording steps occur in synchronization with the group of pictures signal such that the compressed video signal representing a compressed group of pictures of the received video signal is recorded on the record medium at a position immediately following a group of pictures of the previously recorded compressed video signals as indicated by the previously recorded control signal reproduced from the control track of the record medium.

18. The method of claim 16, wherein the step of generating a reproduced color framing signal is carried out by detecting a change of a duty ratio of the reproduced control signal; and generating the reproduced color framing signal from the detected changes of the duty ratio of the reproduced control signal.

19. The method of claim 16, further comprising the steps of:

reproducing the compressed video signal from the record medium;

expanding the reproduced compressed video signal to produce an expanded video signal; and converting in synchronization with the detected color framing signal the expanded video signal into a composite video signal.

20. Method of recording a video signal on a record medium having video signals previously recorded thereon, comprising the steps of:

receiving a video signal to be recorded on the record medium, the record medium having compressed video signals previously recorded thereon in successive oblique tracks and having a control signal previously recorded thereon in a control track;

detecting in the received video signal a color framing signal indicating an occurrence of each new picture in the received video signal;

reproducing the previously recorded control signal from the control track of the record medium;

generating from the reproduced control signal a reproduced color framing signal representing a color framing of the compressed video signals previously recorded on the record medium;

generating a group of pictures signal from the detected color framing signal;

inverting the group of pictures signal when the detected color framing signal and the reproduced color framing signal are out of phase by a predetermined amount;

compressing in synchronization with the group of pictures signal the received video signal to produce a compressed video signal, the compressed video signal representing a compressed group of pictures of the received video signal; and recording in synchronization with the group of pictures signal the compressed video signal on the record medium.

21. The method of claim 20, wherein the compressing and recording steps occur in synchronization with the group of pictures signal such that the compressed video signal representing a compressed group of pictures of the received video signal is recorded on the record medium at a position immediately following a group of pictures of the previously recorded compressed video signals as indicated by the previously recorded control signal reproduced from the control track of the record medium.

22. The method of claim 20, wherein the compressing step is carried out by compressing a successive plurality of pictures of the received video signal, a first of the plurality of pictures not coinciding with a first of the received pictures when the group of pictures signal is inverted.

23. The method of claim 20, wherein the step of generating a reproduced color framing signal is carried out by detecting a change of a duty ratio of the reproduced control signal; and generating the reproduced color framing signal from the detected changes of the duty ratio of the reproduced control signal.

24. The method of claim 20, further comprising the steps of:

reproducing the compressed video signal from the record medium;

expanding the reproduced compressed video signal to produce an expanded video signal; and converting in synchronization with the detected color framing signal the expanded video signal into a composite video signal.

* * * * *